United States Patent
Lyman et al.

(10) Patent No.: US 8,418,455 B2
(45) Date of Patent: Apr. 16, 2013

(54) SHAPE MEMORY ALLOY SEPARATING APPARATUSES

(75) Inventors: Ward D. Lyman, Tucson, AZ (US); Frederick B. Koehler, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 442 days.

(21) Appl. No.: 12/332,004

(22) Filed: Dec. 10, 2008

(65) Prior Publication Data

US 2010/0139264 A1    Jun. 10, 2010

(51) Int. Cl.
*F01B 29/10* (2006.01)
*F02G 1/04* (2006.01)

(52) U.S. Cl.
USPC ................... 60/529; 60/527; 60/528

(58) Field of Classification Search ............. 60/527–529
See application file for complete search history.

(56) References Cited

U.S. PATENT DOCUMENTS

| | | | |
|---|---|---|---|
| 4,716,731 A | 1/1988 | Sakai et al. | |
| 4,899,543 A * | 2/1990 | Romanelli et al. | 60/527 |
| 4,945,727 A | 8/1990 | Whitehead et al. | |
| 5,061,914 A | 10/1991 | Busch et al. | |
| 5,105,178 A | 4/1992 | Krumme | |
| 5,119,555 A * | 6/1992 | Johnson | 29/254 |
| 5,245,738 A | 9/1993 | Johnson | |
| 5,722,709 A * | 3/1998 | Lortz et al. | 294/86.4 |
| 5,916,466 A * | 6/1999 | Dixon | 219/536 |
| 6,126,371 A | 10/2000 | McCloskey | |
| 6,622,971 B1 * | 9/2003 | Robertson | 244/171.1 |
| 7,396,182 B2 * | 7/2008 | Retat et al. | 403/2 |
| 2003/0128491 A1 * | 7/2003 | Bueno Ruiz et al. | 361/115 |
| 2005/0136270 A1 * | 6/2005 | Besnoin et al. | 428/469 |
| 2008/0034750 A1 | 2/2008 | Gao et al. | |
| 2011/0232278 A1 | 9/2011 | Lyman et al. | |
| 2011/0232562 A1 | 9/2011 | Koehler et al. | |
| 2011/0234362 A1 | 9/2011 | Koehler et al. | |

FOREIGN PATENT DOCUMENTS

JP  2006316830 A  * 11/2006
WO  WO-2010068266 A1   6/2010

OTHER PUBLICATIONS

"International Application Serial No. PCT/US2009/06471, Written Opinion mailed Mar. 11, 2010", 13 pgs.
"International Application Serial No. PCT/US2009/06471, Search Report mailed Mar. 11, 2010", 13 pgs.
Roberto, G., "A non-pyrotechnic mUltipoint release system for deployable telescope activated by shape memory alloy wires", *Abstracts of the 55th International Astronautical Congress 2004*, Vancouver, Canada. Oct. 4-8, 2004, 1 pg.
U.S. Appl. No. 13/155,575, filed Jun. 8, 2011, Shape Memory Stored Energy Assemblies and Methods for Using the Same.
U.S. Appl. No. 13/155,581, filed Jun. 8, 2011, Shape Memory Circuit Breakers.
U.S. Appl. No. 13/155,592, filed Jun. 8, 2011, Shape Memory Thermal Sensors.

* cited by examiner

*Primary Examiner* — Thomas E. Denion
*Assistant Examiner* — Christopher Jetton
(74) *Attorney, Agent, or Firm* — Schwegman Lundberg & Woessner, P.A.

(57) ABSTRACT

Embodiments of separating apparatuses are generally described herein. Other embodiments may be described and claimed. In an embodiment, a separating apparatus is provided that comprises a pre-strained member formed from a shape memory alloy that is configured to separate upon application of heat.

18 Claims, 4 Drawing Sheets

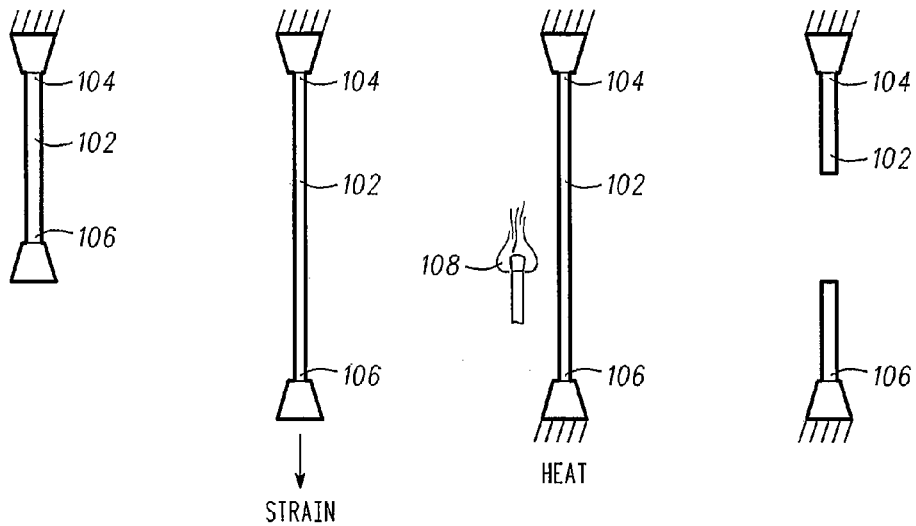
Fig. 1a  Fig. 1b  Fig. 1c  Fig. 1d
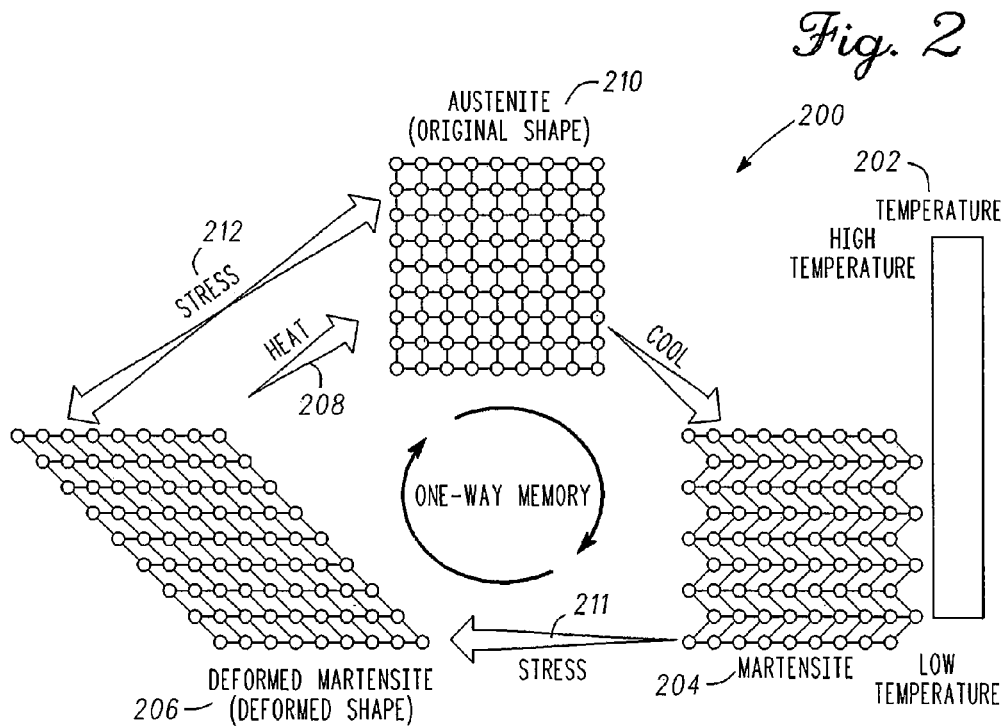

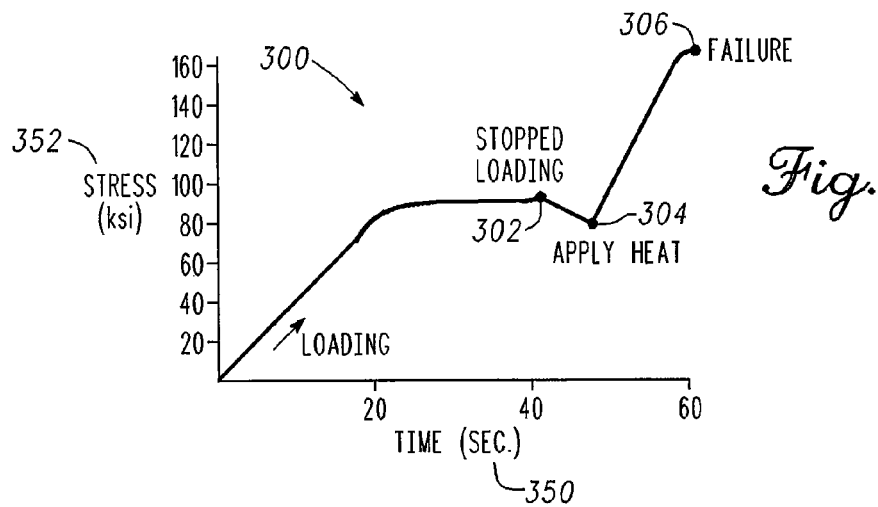
Fig. 3
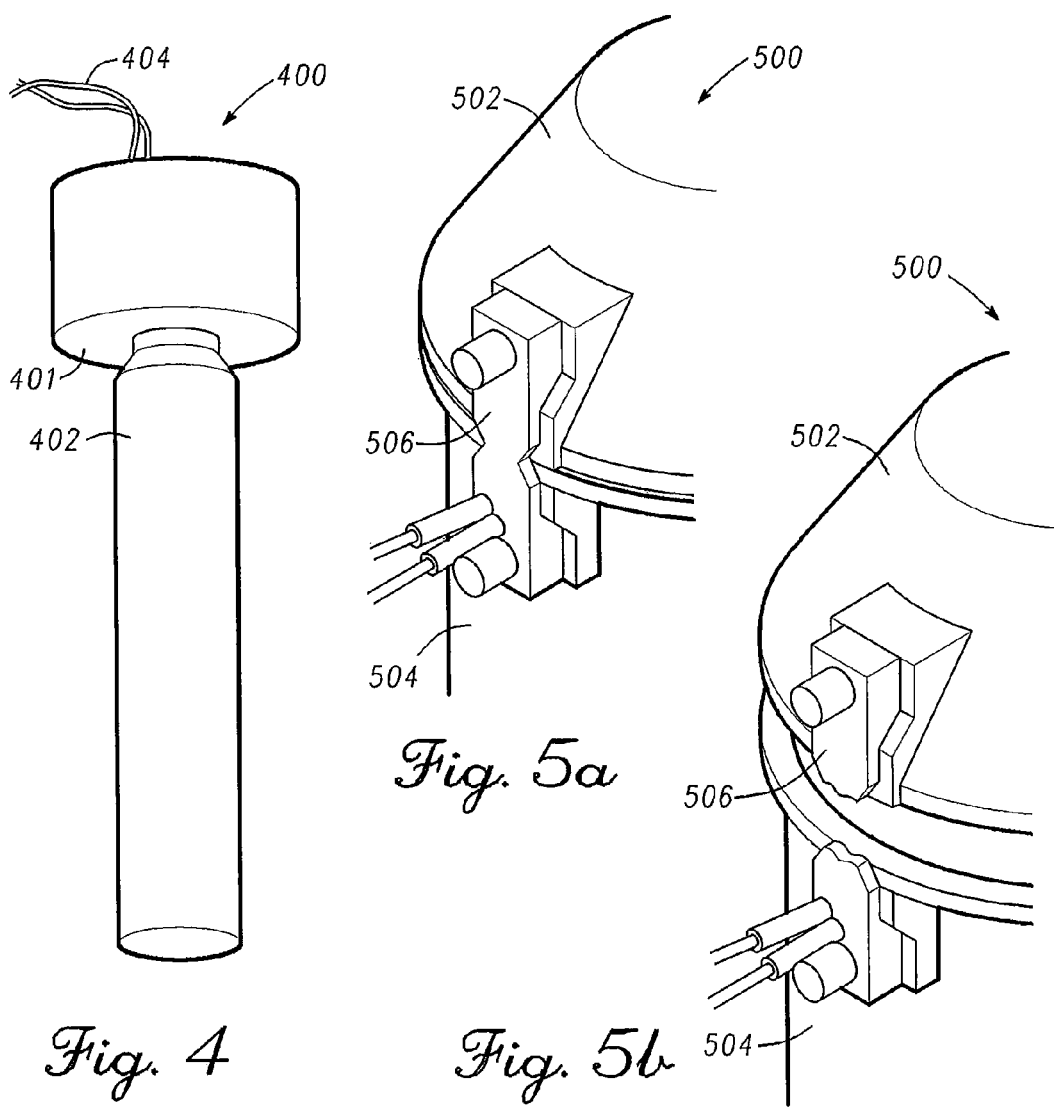
Fig. 4
Fig. 5a
Fig. 5b

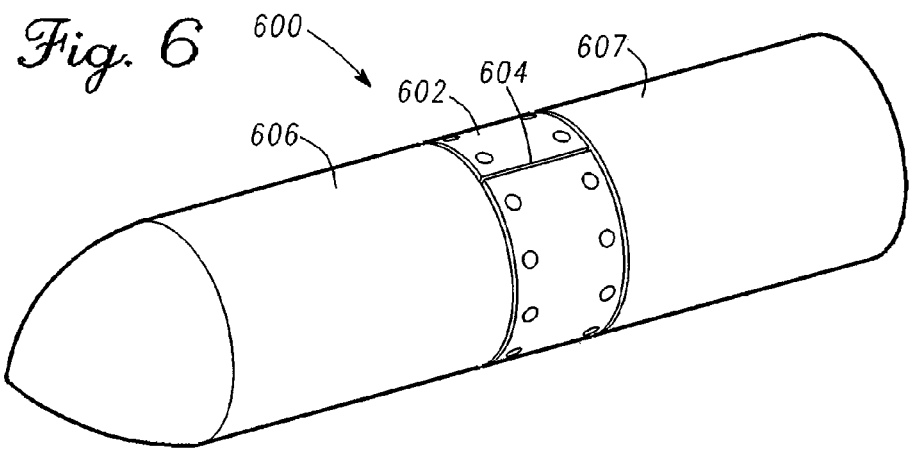
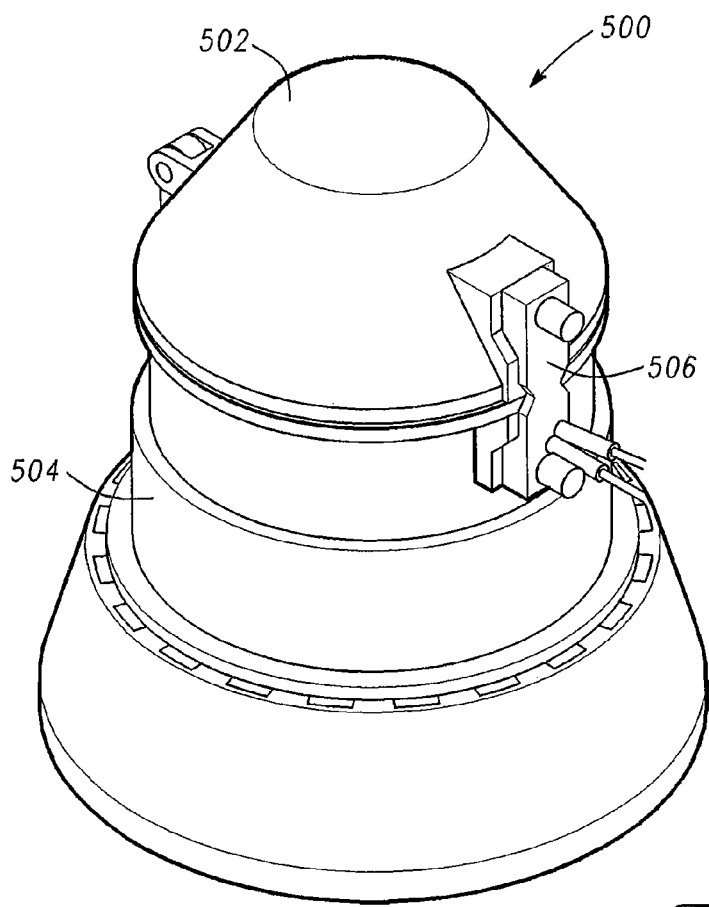

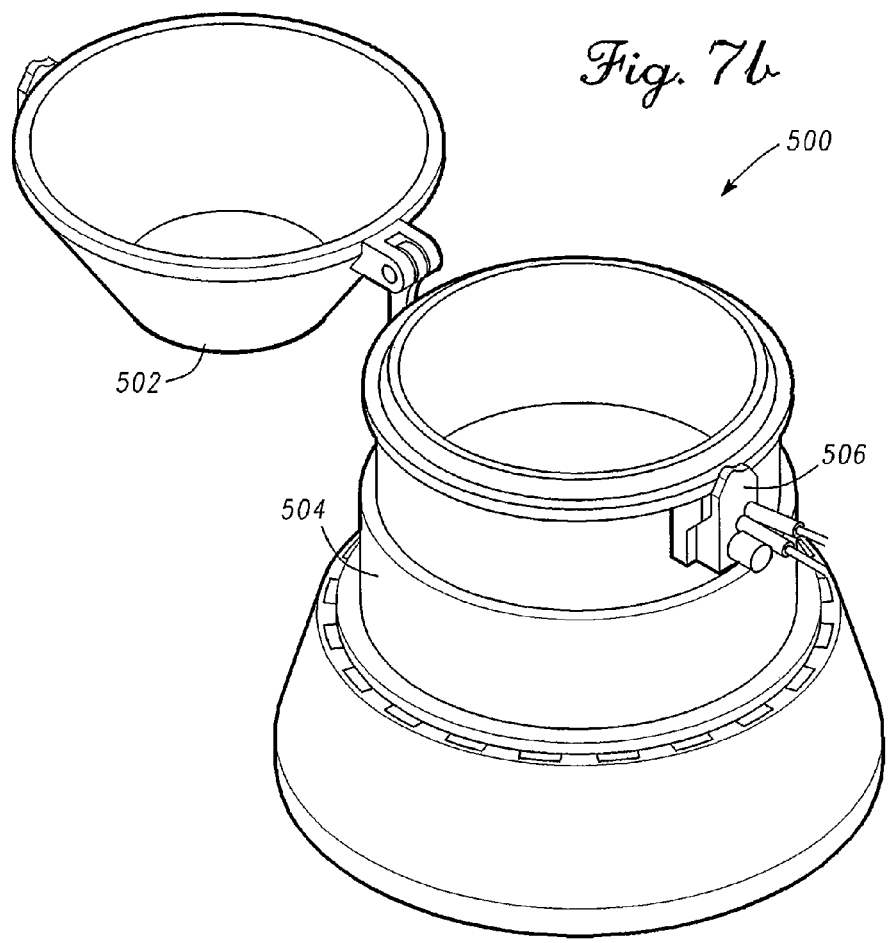
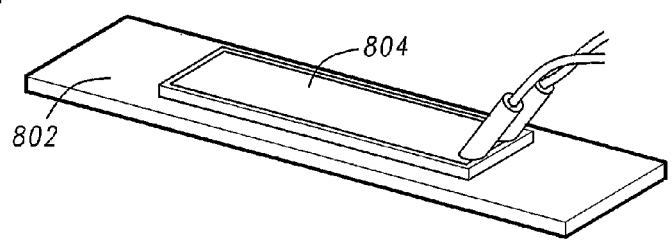
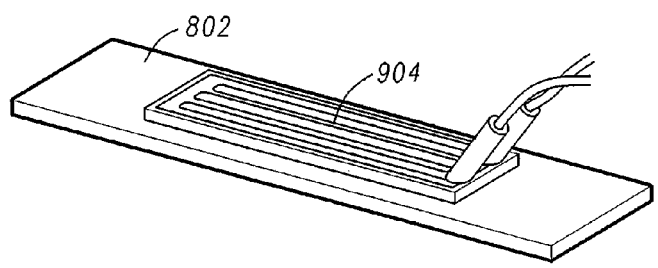

SHAPE MEMORY ALLOY SEPARATING APPARATUSES

FIELD

The present disclosure relates generally to shape memory alloy apparatuses. In an embodiment, the disclosure relates to actuators and coupling apparatuses formed from a shape memory alloy.

BACKGROUND

A variety of apparatuses may be used for actuating objects or holding together objects that need to be later released. For example, an explosive bolt can be used to attach two or more objects and may later release the objects with an explosive force. An explosive bolt incorporates explosives that cause an explosion when initiated or triggered. The explosion breaks apart the explosive bolt to release the objects. The problem with explosive bolts is that they are dangerous to handle because of the explosives and the explosion may exert a large amount of shock load that may damage fragile machinery. In addition, shrapnel pieces or foreign object debris (FOD) resulting from the explosion can interfere with machinery or optics.

SUMMARY

In an embodiment, a separating apparatus is provided that comprises a pre-strained member formed from a shape memory alloy. This member is configured to separate upon application of heat and the separation is configured to actuate an object.

In another embodiment, an apparatus is provided that comprises a first object, a second object, and a separating apparatus that is configured to couple the first object to the second object. In this example, the separating apparatus is formed from a shape memory alloy and is configured to separate upon application of heat.

In yet another embodiment, a separating apparatus is provided that comprises a pre-strained member configured to couple a first object to a second object. The member is formed from a shape memory alloy and is configured to separate and release the first object from the second object upon application of heat.

In still yet another embodiment, a method is provided for actuating an object that is configured to be in contact with an actuator. The actuator has a pre-strained member formed from a shape memory alloy and is configured to be in contact with the actuator. In this method, heat is applied to the member and the application of heat is configured to cause the member to separate, where the separation is configured to actuate the object.

BRIEF DESCRIPTION OF DRAWINGS

The present disclosure is illustrated by way of example and not limitation in the figures of the accompanying drawings, in which like references indicate similar elements and in which:

FIGS. 1a, 1b, 1c, and 1d illustrate the use of heat to separate a separating apparatus formed from a shape memory alloy, in accordance with an embodiment of the invention;

FIG. 2 is a diagram illustrating the various solid phases of a shape memory alloy at different temperatures and stress states;

FIG. 3 illustrates a plot of the mechanical behavior of a shape memory alloy with the application of heat, in accordance with an embodiment of the invention;

FIG. 4 illustrates an example of a separating apparatus, in accordance with an embodiment of the invention;

FIGS. 5a and 5b illustrate another embodiment of a separating apparatus used in a telescope assembly;

FIG. 6 illustrates yet another embodiment of a separating apparatus used in a multistage rocket;

FIGS. 7a and 7b illustrate the use of a separating apparatus to actuate an object upon release, in accordance with an embodiment of the invention;

FIG. 8 illustrates an exothermic reactive foil according to an embodiment of the invention that may be used to generate heat; and FIG. 9 illustrates resistance wires according to another embodiment of the invention that may also be used to generate heat.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

The embodiments described herein provide a variety of separating apparatuses formed from shape memory alloys. An embodiment of the apparatus is an actuator formed from a shape memory alloy. An "actuator," as used herein, refers to an apparatus, mechanism, or mechanical device that is configured to activate or put an object, which is configured to be in contact with the actuator, into motion by imparting directly or indirectly kinetic energy to the object. Another embodiment of the apparatus is a coupling apparatus formed from a shape memory alloy. A "coupling apparatus," as used herein, refers to a mechanical device or mechanism that is configured to couple or hold together two or more objects. A fastener is an example of a coupling apparatus, which, for example, includes bolts, hooks, snaps, screws, nails, pins, rings, pins, and other fasteners. The apparatuses or portions of the apparatuses are formed from a shape memory alloy that exhibits a shape memory effect where, as described in more detail below, the shape memory alloy can be deformed and then returned to its original shape when heated.

As illustrated in FIGS. 1a-1d, this shape memory effect may be used to separate a separating apparatus. FIG. 1a illustrates a member 102 of a separating apparatus formed from a shape memory alloy, in accordance with an embodiment of the invention. As used herein, a "member" refers to a constituent part of a separating apparatus and, in the example of FIG. 1a, the member 102 is in the shape of a bar having two opposing ends 104 and 106 that, as shown in FIG. 1b, are held in place and pulled in opposite directions such that the member 102 is under strain. As illustrated in FIG. 1c, the opposing ends 104 and 106 are fixed in place and a heating source 108 applies heat to the member 102, and upon application of heat, the member 102 separates into two pieces because of the shape memory effect. As used herein, to "separate" is to come apart caused by a break or fracture in the separating apparatus. As described in more detail below, such a unique property of shape memory alloys can be used as a release mechanism for a coupling apparatus or used to actuate an object.

FIG. 2 is a representative diagram 200 illustrating the various solid phases of a shape memory alloy at different temperatures and stress states. The diagram 200 includes a temperature reference 202 identifying a temperature increasing from a low temperature at the bottom of the diagram 200 to a high temperature at the top of the diagram 200. Additionally, the diagram 200 illustrates the different solid phases or crystal structures of a shape memory alloy at temperatures identified by the temperature reference 202.

It should be appreciated that shape memory alloys undergo a temperature related phase change that is characterized by the memory of a mechanical configuration imposed on the material at an annealing temperature. When the shape memory alloy is below some lower temperature, the alloy possesses a particular crystal structure whereby it may be deformed into an arbitrary shape with relative ease. Upon heating the alloy above a higher temperature, the alloy undergoes a change in crystal structure and the shape memory effect is manifested by a resumption of the originally imparted shape, representing the onset of a restoring stress.

FIG. 2 shows a pictorial diagram illustrating the shape memory effect of an example material formed from a shape memory alloy. At a low temperature (e.g., at room temperature), the shape memory alloy is in a martensite phase 204 where the shape memory alloy has a body centered tetragonal crystal structure and may be relatively soft and deformable. When stress 211 is applied to the martensite phase 204, the shape memory alloy is deformed and transformed into a deformed martensite phase 206. For example, the shape memory alloy in the martensite phase 204 may be stretched, compressed, and/or sheared such that it takes on a deformed shape that is in a deformed martensite phase 206. In the deformed martensite phase 206, the atoms may move past each other, but the bonds are not broken, and the atoms are still relatively placed to each other in the same position as the martensite phase 204.

Upon application of heat 208 to the shape memory alloy in the deformed martensite phase 206, which results in heating the shape memory alloy to a high temperature, the shape memory alloy inherently returns to its original shape. It should be noted that the imposition of stress 211 on the shape memory alloy in the martensite phase 204 is one way and causes the deformation of the material (e.g., into the deformed martensite phase 206) that will not go back to its unstressed or pre-stressed form until heat 208 is applied. On the other hand, stress 212 imparted in the austenite phase 210, which is explained in more detail below, is a bidirectional phase change in that when the stress 212 is removed, the shape memory alloy returns back to its unstressed form (e.g., deformed shape) without the addition of heat 208.

In the original shape, the shape memory alloy is in an austenite phase 210, which has a cubic crystal structure. When cooled to a low temperature, the shape memory alloy in the austenite phase 210 transitions back to the martensite phase 204. Unlike other metals, this transition between the phases (austenite phase 210 to martensite phases 204 and 206) is reversible and repeatable. It should be appreciated that a large amount of energy is stored in the deformed martensite phase 206, and this energy used by the shape memory alloy to return to its original shape can also be used to separate the shape memory alloy. Examples of shape memory alloys that exhibit the phases illustrated in FIG. 2 include nickel-titanium alloys (e.g., Nitinol), titanium-nickel alloys, copper-zinc-aluminum alloys, copper aluminum nickel alloys, nickel titanium hafnium alloys, and other shape memory alloys.

FIG. 3 illustrates a plot 300 of the mechanical behavior of a shape memory alloy with the application of heat, in accordance with an embodiment of the invention. The plot 300 is a stress versus time curve of a shape memory alloy where the horizontal axis 350 defines time and the vertical axis 352 defines the stress applied to a shape memory alloy.

As depicted in FIG. 3, the shape memory alloy is loaded or stressed (e.g., pulled, compressed, and/or sheared) for a duration of approximately 40 seconds at a constant strain rate at which point 302 the loading is stopped. Thereafter, at point 304, heat is applied to the shape memory alloy and as a result, the shape memory alloy is further stressed because it wants to return to its original shape. With sufficient stress (e.g., at approximately 160 ksi), the shape memory alloy separates or fails at point 306 of the plot 300.

FIG. 4 illustrates an example of a separating apparatus, in accordance with an embodiment of the invention. The separating apparatus may be in the form of a fracturing bolt 400, which is a type of coupling apparatus, that refers to a variety of fastening rods, pins, or screws that are configured to couple two or more objects together and also configured to separate (or fracture). The fracturing bolt 400 of FIG. 4 comprises a threaded cylindrical shaft member 402 with a head member 401 attached to the cylindrical shaft member 402. Here, both the head member 401 and the cylindrical shaft member 402 are formed from a shape memory alloy. Additionally attached to the fracturing bolt 400 are electrical wires 404 (or electrical leads).

The fracturing bolt 400 is pre-strained. A separating apparatus (e.g., the fracturing bolt 400) is pre-strained when it is preloaded to a predetermined strain value. That is, a separating apparatus is pre-strained when its body or structure is deformed as a result of an applied force. The fracturing bolt 400 is pre-strained such that when heat is applied to the member 402, the member 402 is configured to separate into two pieces. In an embodiment, the heat may be generated by resistance heating, which refers to a process in which heat is generated by passing an electric current through a conductor, such as the threaded cylindrical shaft member 402. In the example of FIG. 4, an electric current may be applied to the cylindrical shaft member 402 by way of the electrical wires 404 to generate heat in the cylindrical shaft member 402. In addition to resistance heating, a variety of other techniques to generate heat may be used, in accordance with other embodiments, which is explained in more detail below.

FIGS. 5a and 5b illustrate another embodiment of a separating apparatus used in a telescope assembly 500. As depicted in FIG. 5a, a telescope assembly 500 is comprised of objects, such as a cover 502 and a housing assembly 504, that are coupled together by a separating apparatus 506 in the form of a coupling apparatus. The separating apparatus 506 is a plate with two holes at both ends of the plate that fit into pegs of the cover 502 and the housing assembly 504, which, when fitted, prevents the cover 506 from being opened or detached from the housing assembly 504.

In this example, heat may be applied to the separating apparatus 506 by resistance heating where an electric current is applied to the separating apparatus 506. As depicted in FIG. 5b, the separating apparatus 506 separates into two pieces when heated and the separation thereby releases the cover 502 from the housing assembly 504 such that the cover 502 can be opened. In another embodiment, the separating apparatus 506, as explained in more detail below, can also be an actuator configured to actuate the cover 502 when separated.

FIG. 6 illustrates yet another embodiment of a separating apparatus 602 used in a rocket 600. The rocket 600 is a multistage rocket that comprises a first stage 606 mounted above a second stage 607 that are held together by a separating apparatus 602 in the form of a coupling apparatus. Each first stage 606 or second stage 607 contains its own engine and propellant. In effect, two rockets (first stage 606 and second stage 607) are stacked on top of each other. In this example, the separating apparatus 602 is a sleeve formed from a shape memory alloy and is configured to wrap around and couple the first stage 606 to the second stage 607.

Upon application of heat to the separating apparatus 602, the separating apparatus 602 separates to allow the first stage 606 to separate from the second stage 607. It should be noted that the location of the separation may be defined by machining a notch 604 into the separating apparatus 602 such that the separating apparatus 602 separates at the notch 604. The separating apparatus 602 illustrated in FIG. 6 may be used to replace traditional explosive mandrels with sheared rivets or traditional explosive bolts currently used to separate the first stage 606 from the second stage 607 of the rocket 600. The separating apparatus 602 has fewer parts when compared with traditional explosive mandrels and traditional explosive bolts, thereby resulting in a more reliable mechanism to allow the separation of the first stage 606 from the second stage 607.

FIGS. 7a and 7b illustrate the use of a separating apparatus 506 to actuate an object upon release, in accordance with an embodiment of the invention. As illustrated in FIG. 7a and also discussed above, a telescope assembly 500 includes a cover 502 and a housing assembly 504 that are coupled together by a separating apparatus 506 formed from a shape memory alloy. In this embodiment, the separating apparatus 506 is in the form of an actuator that stores a large amount of mechanical energy that, when released, may be used to actuate an object.

For example, as illustrated in FIG. 7b, the separating apparatus 506 separates upon the application of heat, and this separation releases or imparts a large amount of kinetic energy to the cover 502 such that the energy snaps open the cover 502. As a result, in addition to releasing the cover 502 from the housing assembly 504, heat may, in effect, also be used to actuate or open the cover 502.

FIG. 8 illustrates an exothermic reactive foil 804 according to an embodiment of the invention that may be used to generate heat. As discussed above, in addition to resistive heating, a variety of other heating techniques may be used to generate heat. For example, in an embodiment, a reactive foil 804 that may be used. In general, a reactive foil 804 is comprised of layers of metals or other materials (e.g., aluminum layers and/or nickel layers) that, when activated by an electric current, chemically react to deliver localized heat. An example of a reactive foil 804 is NANOFOIL®.

As illustrated in FIG. 8, the reactive foil 804 is attached to or deposited on a surface 802 of a separating apparatus 802 by way of, for example, a conductive adhesive. When an electric current is applied to the reactive foil 804, the electric current initiates a chemical reaction in the reactive foil 804 that results in an almost immediate, localized heating of the separating apparatus 802 that is used to separate the separating apparatus 802.

FIG. 9 illustrates resistance wires 904 according to another embodiment of the invention that may also be used to generate heat. A resistance wire 904 is an electrical wire with a high electrical resistivity and is configured to generate heat upon application of an electric current. The resistance wire 904 may, for example, be formed from a nickel-chromium alloy.

As depicted in FIG. 9, resistance wires 904 are attached to a surface of the separating apparatus 802 using, for example, a conductive adhesive. When an electric current is applied to the resistance wires 904, the electric current causes the resistance wires 904 to generate heat, which is used to separate the separating apparatus 802.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the invention may lie in less than all features of a single disclosed embodiment. Thus the following claims are hereby incorporated into the detailed description, with each claim standing on its own as a separate preferred embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A fracturing kinetic energy delivery system comprising:
   a member, the member being formed from a shape memory alloy and a section of the member being configured to separate into a plurality of pieces upon application of heat to the member;
   a first object;
   a second object;
   a first end of the member fixed to the first object;
   a second end of the member coupled with a second object, and the member including the first and second ends couple the first and second objects in a coupling configuration; and
   in a kinetic delivery configuration, the first end of the member fixed to the object is projected away from the second end according to separation of the member into the plurality of pieces, separation of the member and projection of the first end imparting kinetic energy to the first object fixed to the first end to project the first object away from the second end of the member.

2. The fracturing kinetic energy delivery system of claim 1, wherein the shape memory alloy is a nickel-titanium alloy.

3. The fracturing kinetic energy delivery system of claim 1, wherein the member is in a deformed shape, and wherein the application of the heat to the member is configured to return the member to an original shape of the member.

4. The fracturing kinetic energy delivery system of claim 1, wherein the member is threaded.

5. The fracturing kinetic energy delivery system of claim 1, further comprising a reactive foil attached to the member, the reactive foil configured to generate the heat based on a chemical reaction.

6. The fracturing kinetic energy delivery system of claim 1, further comprising a resistance wire attached to the member, the resistance wire configured to generate the heat upon application of an electric current to the resistance wire.

7. The fracturing kinetic energy delivery system of claim 1, wherein both of the first and second ends are configured for fixing with the two objects, respectively.

8. The fracturing kinetic energy delivery system of claim 1, wherein the plurality of pieces of the member in the kinetic delivery configuration include only a first piece and a second piece, and the first piece is associated with the first end of the member and configured for fixing with one of the two objects, and the second piece is associated with the second end of the member and configured for fixing with the other of the two objects.

9. The fracturing kinetic energy delivery system of claim 1, wherein the member includes at least one of a bolt, a shaft, a rod, a strip, a pin or a screw.

10. A fracturing kinetic energy delivery system comprising:
    a first object;
    a second object; and
    a fracturing member having first and second ends and comprising a shape memory alloy, the fracturing member is configured to couple the first and second object in a coupling configuration and project one of the first or second object from the other of the second or first object in a kinetic delivery configuration:
        in the coupling configuration the first and second ends are coupled with the first and second objects, respectively, and at least one of the first and second ends is fixed with the corresponding first or second object, and
        in the kinetic delivery configuration the shape memory alloy of the fracturing member is configured to separate into a plurality of pieces, separation releasing the first object from the second object upon application of heat to the fracturing member, and separation imparting kinetic energy to at least one of the first or second ends fixed to the first or second objects and accordingly projecting the first or second object away from the other of the second or first object.

11. A fracturing kinetic energy delivery system of claim 10, wherein the apparatus is a rocket, and wherein the first object is a first stage of the rocket and the second object is a second stage of the rocket.

12. A fracturing kinetic energy delivery system of claim 10, wherein the apparatus is a telescope, wherein the first object is a cover and the second object is a housing assembly.

13. A fracturing kinetic energy delivery system of claim 10, wherein the heat is applied to the shape memory alloy by applying an electrical current to the fracturing member.

14. A fracturing kinetic energy delivery system of claim 10, wherein the fracturing member comprises:
    a head member; and
    a cylindrical shaft member attached to the head member, the cylindrical shaft member being formed from the shape memory alloy and a section of the cylindrical shaft member being configured to separate into the plurality of pieces upon application of the heat to the cylindrical shaft member.

15. The fracturing kinetic energy delivery system of claim 10, wherein both of the first and second ends are respectively fixed with the first and second objects.

16. The fracturing kinetic energy delivery system of claim 10, wherein the plurality of pieces of the fracturing member in the kinetic delivery configuration include only a first piece and a second piece, and the first piece is fixed to the first object and the second piece is fixed to the second object.

17. The fracturing kinetic energy delivery system of claim 10, wherein at least one groove is provided in the fracturing member at an interface between the first and second objects, and in the kinetic delivery configuration the fracturing member separates along the at least one groove.

18. The fracturing kinetic energy delivery system of claim 10, wherein the member includes at least one of a bolt, a shaft, a rod, a strip, a pin or a screw.

* * * * *

UNITED STATES PATENT AND TRADEMARK OFFICE
CERTIFICATE OF CORRECTION

PATENT NO. : 8,418,455 B2  
APPLICATION NO. : 12/332004  
DATED : April 16, 2013  
INVENTOR(S) : Lyman et al.

Page 1 of 1

It is certified that error appears in the above-identified patent and that said Letters Patent is hereby corrected as shown below:

On the title page, in column 2, Item (56), under "Other Publications", line 1, delete "PCT/US2009/06471 ," and insert --PCT/US2009/06471,--, therefor On the title page, in column 2, Item (56), under "Other Publications", line 3, delete "PCT/US2009/06471 ," and insert --PCT/US2009/06471,--, therefor On the title page, in column 2, Item (56), under "Other Publications", line 5, delete "mUltipoint" and insert --multipoint--, therefor On the title page, in column 2, Item (56), under "Other Publications", line 8, delete "Canada." and insert --Canada,--, therefor In the Specification In column 2, line 50, after "rings,", delete "pins,", therefor In column 2, line 55, delete "returned" and insert --returns--, therefor In the Claims In column 6, line 52, in Claim 1, delete "proiect" and insert --project--, therefor In column 7, line 8, in Claim 8, delete "include" and insert --includes--, therefor In column 8, line 27, in Claim 16, delete "include" and insert --includes--, therefor Signed and Sealed this  
Seventeenth Day of September, 2013

Teresa Stanek Rea  
*Deputy Director of the United States Patent and Trademark Office*